US010223668B2

(12) United States Patent
Schwartz (10) Patent No.: US 10,223,668 B2
(45) Date of Patent: *Mar. 5, 2019

(54) CONTEXTUAL SEARCHING VIA A MOBILE COMPUTING DEVICE

(71) Applicant: International Business Machines Corporation, Armonk, NY (US)

(72) Inventor: Robyn R. Schwartz, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/933,520

(22) Filed: Mar. 23, 2018

(65) Prior Publication Data

US 2018/0211211 A1    Jul. 26, 2018

Related U.S. Application Data

(63) Continuation of application No. 15/646,168, filed on Jul. 11, 2017, now Pat. No. 9,984,357, which is a continuation of application No. 14/076,592, filed on Nov. 11, 2013, now Pat. No. 9,767,430.

(51) Int. Cl.
*G06Q 10/08* (2012.01)
*G06Q 30/02* (2012.01)
*H04W 4/02* (2018.01)

(52) U.S. Cl.
CPC ....... *G06Q 10/087* (2013.01); *G06Q 30/0201* (2013.01); *G06Q 30/0281* (2013.01); *H04W 4/02* (2013.01)

(58) Field of Classification Search
None
See application file for complete search history.

(56) References Cited

U.S. PATENT DOCUMENTS 9,767,430 B2    9/2017  Schwartz
2007/0016492 A1    1/2007  Linker et al.
(Continued)

OTHER PUBLICATIONS

Wang et aL., "Interactive Web Video Advertising with Context Analysis and Search", Proceedings of the 2010 2oth International Conference on Pattern Recognition (ICPR 2010), pp. 3252-3255, Copyright 2010 IEEE Computer Society.

(Continued)

*Primary Examiner* — Mehmet Yesildag
(74) *Attorney, Agent, or Firm* — Schmeiser, Olsen & Watts, LLP; Jay Wahlquist (57) ABSTRACT

A method and associated system for processing a search query to retrieve product information and offers that are customized for an end user. An electronic planogram including expected locations of a product in a retail store is generated. A received communication includes a query object, an approximate location of the product in the retail store, and a database search query. From a comparison between the approximate and expected locations of the product, an electronic message is generated to communicate, to employees of the retail store, that the product is misplaced in the retail store. The database search query is performed for retrieving product information offers that are customized for the end user. The query object and the electronic planogram are used to identify products that have been misplaced, maintain adequate inventory levels to meet customer demands, and track the location of products within the retail store.

20 Claims, 4 Drawing Sheets

(56) References Cited

U.S. PATENT DOCUMENTS

| | | | |
|---|---|---|---|
| 2007/0016494 A1 | 1/2007 | Brown et al. | |
| 2010/0030578 A1* | 2/2010 | Siddique | G06Q 10/0637 705/3 |
| 2011/0170772 A1 | 7/2011 | Dharssi | |
| 2013/0050205 A1 | 2/2013 | Beaver, III et al. | |
| 2013/0144757 A1 | 6/2013 | Bauer et al. | |
| 2013/0215116 A1* | 8/2013 | Siddique | G06Q 30/0643 345/420 |
| 2017/0308848 A1 | 10/2017 | Schwartz | |

OTHER PUBLICATIONS

Disclosed Anonymously, "Detection and Reaction to Contextual Information Based on Analysis of a Live Data Stream", An IP.com Prior Art Database Technical Disclosure, IP.com No. IPCOM000196971D, Jun. 22, 2010, pp. 1-4.

IBM, "System and Method to Enrich Images with Semantic Data", An IP_com Prior Art Database Technical Disclosure, IP.com No. IPCOM000156659D, Jul. 30, 2007, pp. 1-9.

Office Action (Apr. 7, 2016) for U.S. Appl. No. 14/076,592, filed Nov. 11, 2013.

Amendment (Aug. 8, 2016) for U.S. Appl. No. 14/076,592, filed Nov. 11, 2013.

Final Office Action (Oct. 4, 2016) for U.S. Appl. No. 14/076,592, filed Nov. 11, 2013.

Final Amendment (Dec. 2, 2016) for U.S. Appl. No. 14/076,592, filed Nov. 11, 2013, Advisory Action (Dec. 28, 2016) for U.S. Appl. No. 14/076,592, filed Nov. 11, 2013.

RCE and preliminary amendment (Jan. 3, 2017) for U.S. Appl. No. 14/076,592, filed Nov. 11, 2013.

Office Action (Jan. 27, 2017) for U.S. Appl. No. 14/076,592, filed Nov. 11, 2013.

Amendment (Apr. 25, 2017) for U.S. Appl. No. 14/076,592, filed Nov. 11, 2013.

Notice of Allowance (May 17, 2017) for U.S. Appl. No. 14/076,592, filed Nov. 11, 2013.

Office Action (Aug. 25, 2017) for U.S. Appl. No. 15/646,168, filed Jul. 11, 2017.

Amendment (Nov. 22, 2017) for U.S. Appl. No. 15/646,168, filed Jul. 11, 2017.

Notice of Allowance (Jan. 23, 2018) for U.S. Appl. No. 15/646,168, filed Jul. 11, 2017.

* cited by examiner

CONTEXTUAL SEARCHING VIA A MOBILE COMPUTING DEVICE

This application is a continuation application claiming priority to Ser. No. 15/646,168, filed Jul. 11, 2017, now U.S. Pat. No. 9,984,357, issued May 29, 2018, which is a continuation application of Ser. No 14/076,592, filed Nov. 11, 2013, U.S. Pat. No. 9,767,430, issued Sep. 19, 2017.

BACKGROUND

1. Field of the Invention

The present invention relates generally to contextual searching, and more particularly to generating a contextual search query to retrieve product information and offers that are customized for an end user based on data collected from a mobile computing device.

2. Description of the Related Art

Currently many businesses provide search tools to enable a potential customer to query a database (e.g., searchable electronic catalog) and retrieve information from the database about products and services they offer. However, conventional search tools that are utilized to generate a query may retrieve information about products and services that are irrelevant to the potential customer's interests and needs. As a result, the potential customer may become frustrated and look elsewhere for products and services, which can result in a missed revenue opportunity. Moreover, if many potential customers submit queries that retrieve information about a product and/or service, this may be an indication that there is a rise in demand for the product and/or service that requires an adjustment to inventory levels in order to anticipate the demand. Accordingly, to avoid missing revenue opportunities and to be adequately prepared for a rise in demand in regard to their products and services, businesses are continuously looking for ways to provide information that is relevant to the potential customer's interests and needs while also managing inventory levels.

SUMMARY

Aspects of an embodiment of the present invention disclose a method, computer system, and program product for generating a contextual search query to retrieve product information and offers that are customized for an end user. In response to a mobile computing device querying information for a product such as scanning a barcode of the product within a retail store, a computer may instruct a camera of the mobile computing device to capture an image as part of a query object for the product. Other data, such as product name or text entry may be used to begin the product query. The computer adjusts a calculation of an approximate location of the product via use of distance vectors that are within the information that is collected for the query of the product. The computer generates a query object to perform the query, wherein the query object includes the information that is collected. The computer defines an optimal arrangement of products within the retail store based on an aggregation of shopping preference and buying pattern information within the query object and other query objects that are received over a period of time. The computer updates an electronic planogram based on the optimal arrangement of products. The computer retrieves product information that is customized for an end user, based on the query object generated.

BRIEF DESCRIPTION OF THE SEVERAL VIEWS OF THE DRAWINGS

The subject matter which is regarded as an embodiment of the present invention is particularly pointed out and distinctly claimed in the claims at the conclusion of the specification. One manner in which recited features of an embodiment of the present invention can be understood is by reference to the following detailed description of embodiments, taken in conjunction with the accompanying drawings in which:

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA, Smalltalk, C++ or the like, conventional procedural programming languages such as the "C" programming language, a hardware description language such as VERILOG, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Exemplary embodiments now will be described more fully herein with reference to the accompanying drawings. This disclosure may, however, be embodied in many different forms and should not be construed as limited to the exemplary embodiments set forth herein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

Embodiments of the present invention provide a contextual query search program having program code for generating a contextual search query (i.e., a query object) that can retrieve product information and offers that are customized for an end user based on data collected from a mobile computing device. The contextual search query can be generated using both known (i.e., pre-configured) and collected data points (i.e., ancillary and additive data sources) from a mobile computing device. Specifically, the contextual query search program on a mobile computing device (e.g., a smartphone or other mobile computing device) generates a query object to perform a query, and sends the query object to an inventory tracker program that is installed on a server computer. The inventory tracker program utilizes information within the query object to update inventory management metrics within an inventory management software system, and to update an electronic planogram on the server computer. Thus, retail store management can utilize the contextual query search program along with the inventory tracker program to maintain adequate inventory levels to meet customer demands, track the location of products and assets within a retail store, and retrieve product information and offers from a product catalog database. The product information and offers retrieved is customized for an end user based on data collected (e.g., shopping preferences and buying patterns of the end user) from their mobile computing device. The product information and offers retrieved can include information about goods and services such the availability of products and services, sale promotions, and discounts such as discounts on cross-sell and up-sell items that the end user may be interested in that are available at the retail store.

Figure 1:
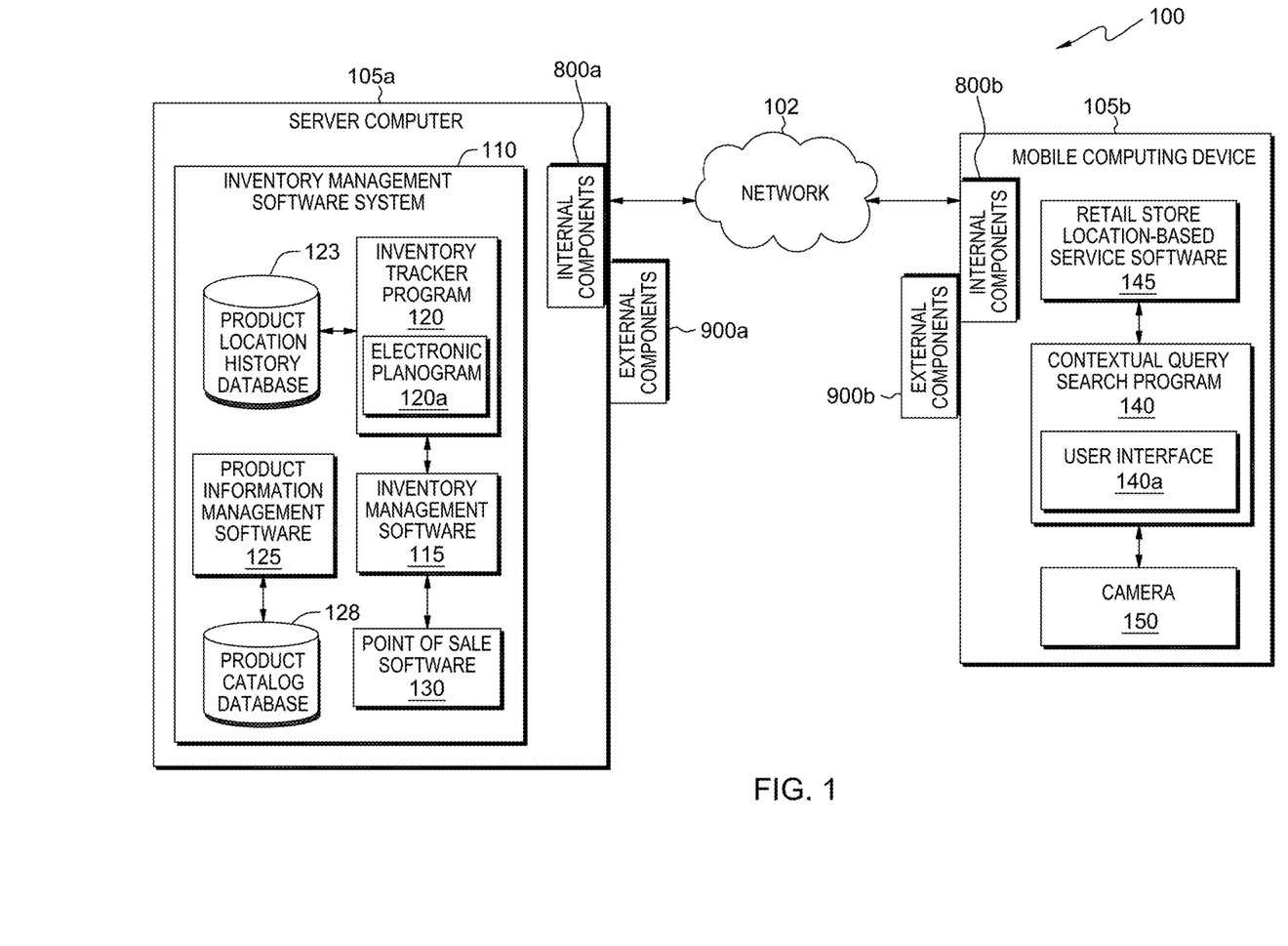
FIG. 1 is a block diagram of a distributed computer system that includes a mobile computing device having program code that includes a contextual query search program that interacts with an inventory management software system on a server computer, wherein the inventory management software system receives a query object (i.e., an object that represents a database query), via an inventory tracker program, from the contextual query search program according to an embodiment of the present invention.

FIG. 1 illustrates computer system 100 that includes network 102, server computer computer 105a, and mobile computing device 105b. Server computer 105a and mobile computing device 105b each include respective internal components 800a and 800b, and respective external components 900a and 900b, as described below in more detail with respect to FIG. 3. Server computer 105a includes inventory management software system 110 having databases and computer program software that include the following: inventory management software 115, inventory tracker program 120 with electronic planogram 120a, product location history database 123, product information management software 125, product catalog database 128, and point of sale software 130. Mobile computing device 105b is installed with computer program software that includes contextual query search program 140 having user interface 140a and retail store location-based service software 145. Mobile computing device 105b also includes camera 150 for capturing images and/or videos.

Computer system 100 can utilize generalized shopper (i.e., customer) queries (i.e., query objects) generated by contextual query search program 140 to retrieve product information and offers that includes information about a product location, inventory levels associated with the product, and product offerings based on shopping preferences of a customer. The product information offers that are retrieved are viewable through user interface 140a on mobile computing device 105b. Computer system 100 may utilize a retailer specific predetermined consumer application to identify the location of the consumer owned device (i.e., mobile computing device 105b), but computer system 100 does not have to be dependent on a shopper's compliance with utilizing the pre-determined consumer application. A shopper can utilize mobile computing device 105b to generate contextual queries (i.e., query objects) that can retrieve product information and offers. Specifically, to generate the queries the shopper can input (e.g., scan or manually enter) into contextual query search program 140 a product name, description, product code, or contextual information via various means that include the following: an image with metadata, a video with metadata, a barcode (e.g., a quick response code) with metadata, Bluetooth interaction with the product, radio-frequency identification (RFID) with metadata, a universal product code (UPC) with metadata, and a stock-keeping unit (SKU) code with metadata.

Mobile computing device 105b can be a cellular phone (e.g., smartphone), tablet, or any other portable electronic computing device that is capable of running computer program code such as contextual query search program 140 and retail store location-based service software 145. Mobile computing device 105b can scan a barcode (i.e., make an electronic product inquiry), receive manually entered data (e.g., a UPC, quick response code data, a SKU code, a unique descriptor, or a combination thereof), and generate metadata associated with an image and/or a video having information that can be utilized to identify a product and an expected location of the product. The barcode mentioned above can be a two-dimensional barcode (e.g., a quick response code). The metadata that is generated can be utilized by contextual query search program 140 to retrieve product information and offers, and collect ancillary data associated with the product. In particular, the metadata includes information about current season and current time of day during which the image was captured, and shopping preferences and buying patterns. The information about the shopping preferences and buying patterns can be extracted from a profile of an end user who is a customer of the retail store. For example, the information within the profile of the end user can include color preferences, fit or design preferences, pattern or texture preferences, price range preferences, and time of day shopping preferences for the end user. The information within the profile of the end user can also include past purchases as well as buying patterns and tendencies including price preferences (e.g., price sensitivity preferences). Moreover, the profile can be stored in memory on mobile computing device 105b, and updated periodically based on interaction of the end user with products within the retail store.

Inventory management software 115, mentioned above, is a computer software application that is configured to compute the quantity of products available for sale within the retail store's inventory. Inventory tracker program 120 can receive a query object generated by contextual query search program 140 subsequent to an end user of mobile computing device 105b capturing an image of a product (e.g., capturing a photo or video having an image of a product). The query object can include a unique product identifier (ID) and an expected location of the product, wherein the product may have a barcode that can be read (e.g., scanned) by mobile computing device 105b. Furthermore, the query object can include a photo with metadata, a video with metadata, a barcode [e.g., a quick response (QR) code] with metadata, radio-frequency identification (RFID) with metadata, a universal product code (UPC) with metadata, and a stock-keeping unit (SKU) code with metadata.

In addition to receiving the query object, inventory tracker program 120 can also receive from retail store location-based service software 145 or from some other means of identifying the location of the consumer owned device (i.e., mobile computing device 105b), information associated with a product having a barcode (e.g., quick response code, RFID tag, SKU code, or UPC). The information received includes a calculation of the approximate location of the product at the time the product was last queried by mobile computing device 105b (e.g., a shopper owned or store owned device) within a retail store prior to the product being purchased. Inventory tracker program 120 can store each calculation of the approximate location of a product received, in product location history database 123. Each calculation of the approximate location of the product, stored in product location history database 123, can be associated to a unique identifier of the product.

In addition, in response to receiving the query object from contextual query search program 140, inventory tracker program 120 can send a request to inventory management software 115 to return product information and offers from product catalog database 128. Based on the request from inventory tracker program 120, inventory management software 115 can instruct product information management software 125 to utilize metadata within the query object in order to extract the product information and offers from product catalog database 128. Specifically, product information management software 125 can utilize metadata within the query object received in order to extract product information and offers that are customized for the end user of mobile computing device 105b.

The product information and offers extracted from product catalog database 128 can then be sent by product information management software 125, via inventory management software 115, to inventory tracker program 120. The product information and offers extracted from product catalog database 128 can include the following: fit of a product, season of a product, style of a product, stock-keeping unit (SKU) of a product, aspect ratio of a product, weight of a product, expiration date of a product, an electronic image representing a product, peer and critical reviews by consumers, and cross-sell and up-sell items. In addition, inventory management software 115 is configured to interact with point of sale software 130 that records each sale transaction of a product, utilize each sale transaction that is recorded to update the quantity of products available for sale within the retail store's inventory, and send a notification of each sale transaction of a product to inventory tracker program 120. Inventory tracker program 120 can utilize each notification of a sale transaction to generate an updated version of electronic planogram 120a having an updated quantity for each product in the sale transaction.

Furthermore, inventory tracker program 120 manages electronic planogram 120a. Electronic planogram 120a defines an expected location of each product within a retail store, and provides a graphical representation of the expected location and quantity of each product on the sales floor of the retail store. Inventory tracker program 120 can utilize the product information extracted from product catalog database 128 to generate electronic planogram 120a defining a location and a quantity of each product within the retail store at a specific point in time. Inventory tracker program 120 can also aggregate the shopping preference and buying pattern information within the metadata of each query object received over a period of time, and utilize the aggregated information to define an optimal arrangement of products within the retail store. For example, the optimal arrangement of the products may be an arrangement that maximizes visibility of each product to customers within the retail store who are most likely to buy the product. Thus, revenue generated by the retail store from the sale of the product may increase due to the optimal arrangement of products. Moreover, inventory tracker program 120 can be configured to update electronic planogram 120a on a periodic basis (i.e., hourly, daily, weekly, bi-weekly, monthly, quarterly, yearly, etc.) in order to comply with the optimal arrangement of products that is defined.

Figure 2A:
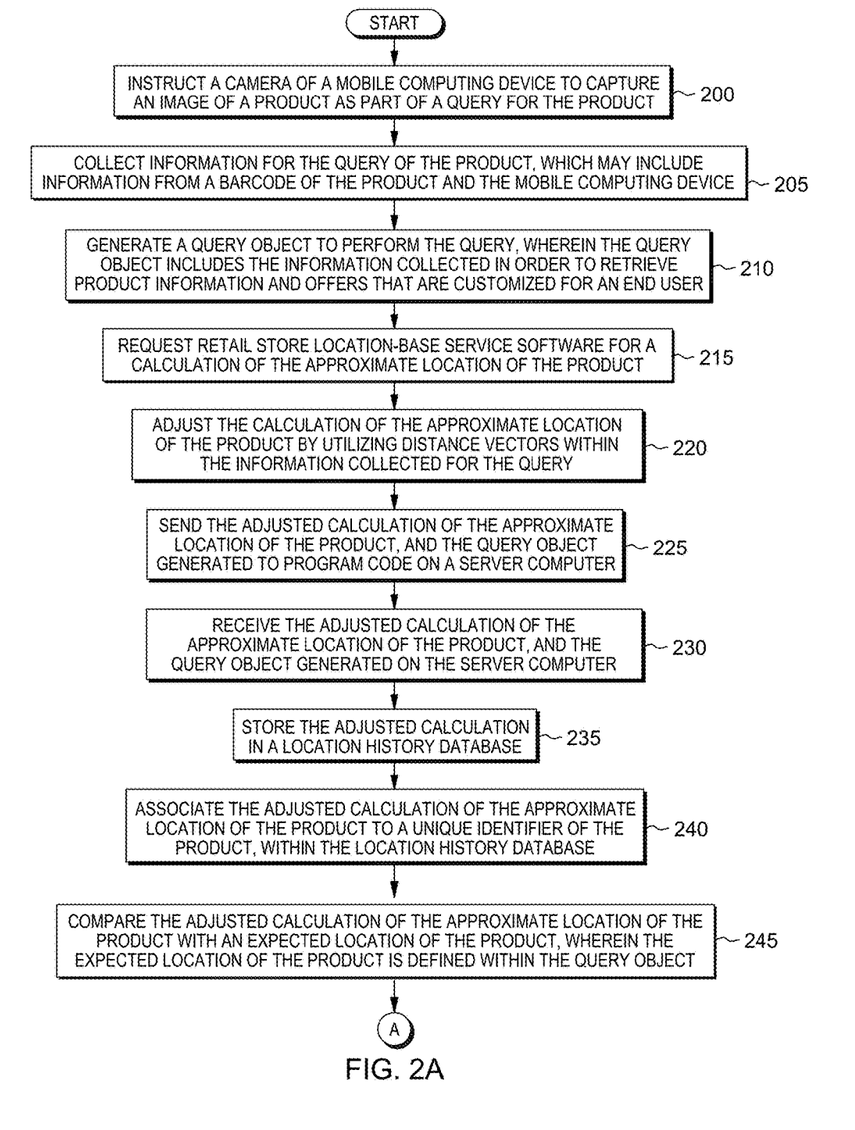
FIGS. 2A and 2B are flowcharts illustrating operations of the program code within the inventory tracker program utilizing information within the query object to update inventory management metrics and an electronic planogram within the inventory management software system on the server computer of FIG. 1, and to retrieve product information and offers that are customized for an end user according to an embodiment of the present invention.
Figure 2B:
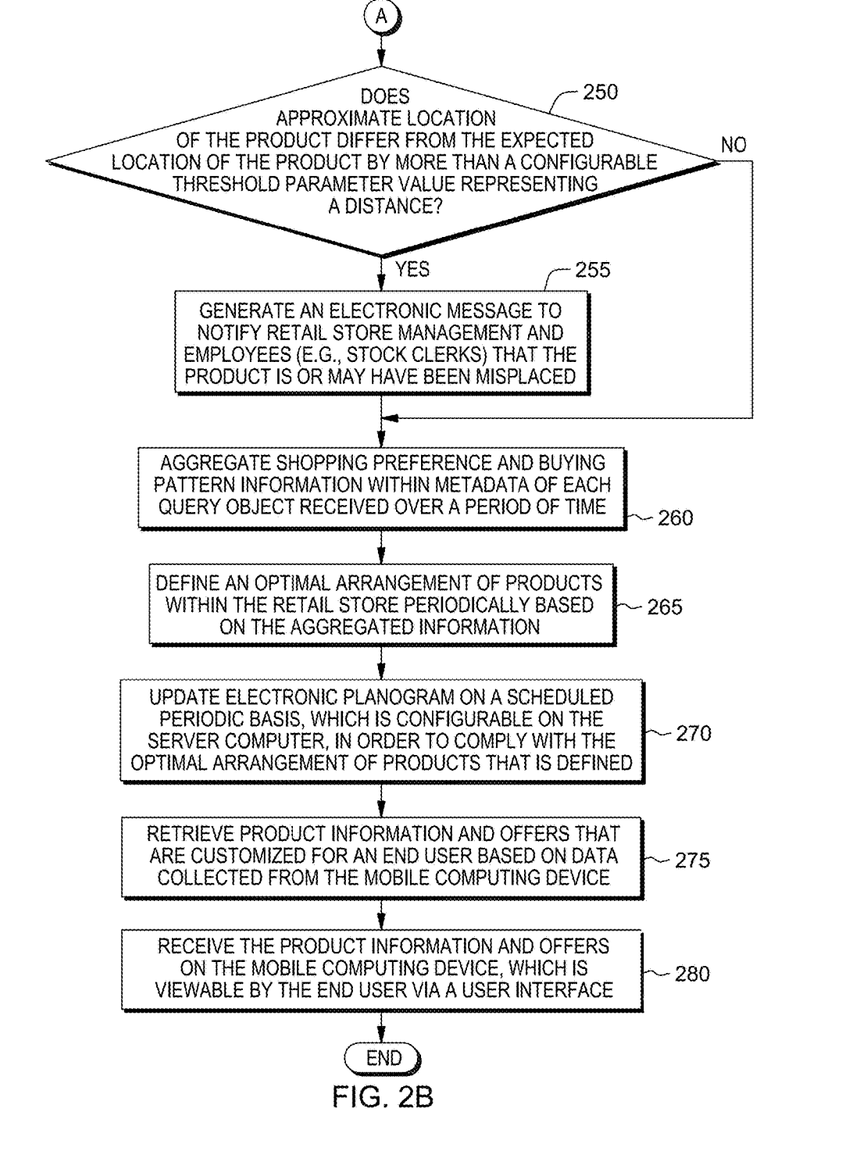

FIGS. 2A and 2B are flowcharts illustrating the steps of the program code of inventory tracker program 120 and contextual query search program 140 for generating a contextual search query to retrieve product information and offers that are customized for an end user based on data collected from mobile computing device 105b. In response to an end user, who is a shopper, in a retail store may use mobile computing device 105b to scan a barcode (e.g., a quick response code) of a product in the retail store, contextual query search program 140 may instruct camera 150 of mobile computing device 105b to capture an image of a product as part of a query for the product (e.g., capturing a photo or video having an image of a product) (block 200). Step 200 is optional.

Next, contextual query search program 140 collects information for the query (e.g., information from the image) of the product, which may include information from a barcode of the product and mobile computing device 105b (block 205). Subsequently, contextual query search program 140 generates a query object to perform the query, wherein the query object includes the information collected in order to retrieve product information and offers that are customized for an end user (block 210). The barcode of the product, mentioned above, can be a quick response (QR) code, RFID tag, SKU code, or UPC. Barcode scanning is an optional part of step 205. The query object is generated by concatenating the information collected into a delimited string, and transforming the string into a database query interpretable by product catalog database 128.

The information collected for the query are derivable data points from mobile computing device 105b (e.g., data points from the image), which includes parameters for inventory tracker program 120 to identify the product as well as the type and amount of other ancillary products, if any, that are located adjacent to the product. The type and amount of other ancillary products identified that are located adjacent to the product, can be utilized by inventory tracker program 120 to determine if the product is misplaced. In addition, the information collected for the query (e.g., information collected from the image) includes data for inventory tracker program 120 to estimate a location (i.e., approximate x, y, and z coordinates) of the product as well as other ancillary products identified within the query (e.g., ancillary products within the image), relative to mobile computing device 105b at the time the query was performed. For example, the information collected for the query can include distance vectors between mobile computing device 105b and the product and/or the other ancillary products identified within the image at the time the query was performed, which can be used with other calculations to more accurately determine the location of the product.

The information collected from the barcode may include the following: a unique identifier of the product, expected location (i.e., x, y, and z coordinates) of the product within the retail store, number of days in inventory, size, color, fit, season, style, vendor, department, ingredients, type of fabrics, contents, dimensions, price, and promotions. The barcode can be a two-dimensional barcode (e.g., a quick response code) that can contain an expected location of the product within the retail store and even a uniform resource locator (URL) to access product information stored in product catalog database 128.

Furthermore, the information collected from mobile computing device 105b may include personal calendar events (e.g., birthdays, holidays, vacations, etc), parameters from a profile associated with an end user who is a customer of the retail store, wherein the parameters can be utilized to determine shopping preferences and buying patterns of the end user. Buying/shopping patterns can be leveraged in service of individual shoppers, but are also of use at a more holistic level in regard to planning and managing the physical layout, and inventory and product management of the retail store. The parameters from the profile can include the following: color preferences, design pattern preferences, size preferences, texture preferences, price range preferences, traffic behavior pattern within a retail store, and time of day shopping preferences. The profile can be stored in memory on mobile computing device 105b.

In response to generating the query object, contextual query search program 140 requests retail store location-based service software 145 for a calculation of the approximate location of the product (block 215). The calculation of the approximate location of the product is based on where mobile computing device 105b was located at the time mobile computing device 105b was utilized. Thus, for example, each time a shopper scans a barcode on a product within the retail store's inventory, then retail-store location-based service software 145 calculates an approximate location of the product and sends each calculation of the approximate location of the product to contextual query search program 140. Next, in order to more accurately determine the location of the product at the time the query was performed, contextual query search program 140 adjusts the calculation of the approximate location of the product by utilizing distance vectors within the information collected for the query (e.g., information collected from the image captured by camera 150) (block 220).

Subsequently, contextual query search program 140 sends the adjusted calculation of the approximate location of the product, and the query object generated to the program code (i.e., inventory tracker program 120) on server computer 105a (block 225). Inventory tracker program 120 receives the adjusted calculation of the approximate location of the product, and the query object generated on server computer 105a (block 230), and stores the adjusted calculation in location history database 123 (block 235). Next, the program code of inventory tracker program 120 associates the adjusted calculation of the approximate location of the product to a unique identifier of the product, within location history database 123 (block 240). Thus, if more shoppers scan the barcode on the product, then more adjusted calculations of the approximate location of the product are stored, by inventory tracker program 120, in location history database 123 and are associated to the unique identifier of the product.

Next, inventory tracker program 120 compares the adjusted calculation of the approximate location of the product with an expected location of the product, wherein the expected location of the product is defined within the query object (block 245). Subsequently, inventory tracker program 120 determines whether the approximate location of the product that is calculated differs from the expected location of the product by more than a configurable threshold parameter value representing a distance (decision block 250).

If the approximate location of the product does not differ from the expected location of the product by more than the configurable threshold parameter value representing a distance (decision block 250, "NO" branch), then inventory tracker program 120 aggregates shopping preference and buying pattern information within metadata of each query object received over a period of time (block 260). Otherwise, if the approximate location of the product that is calculated differs from the expected location of the product by more than a configurable threshold parameter value representing a distance (decision block 250, "YES" branch), then inventory tracker program 120 generates an electronic message to notify retail store management and employees (e.g., stock clerks) that the product may have been misplaced (block 255). In the disclosed embodiment, the configurable threshold parameter value ranges from about twenty meters to fifty meters. Inventory tracker program 120 sends the electronic message that is generated to inventory management software 115, wherein inventory management software 115 can broadcast the message to employees.

Subsequent to generating the electronic message to notify retail store management and employees that the product may have been misplaced, inventory tracker program 120 aggregates shopping preference and buying pattern information within metadata of each query object received over a period of time (block 260), and defines an optimal arrangement of products within the retail store periodically based on the aggregated information (block 265). For example, the optimal arrangement of the products may be an arrangement based on traffic behavior pattern within a retail store and/or season as represented by the metadata. The optimal arrangement can maximize visibility of each product to customers within the retail store who are most likely to buy the product. Next, inventory tracker program 120 updates electronic planogram 120a on a scheduled periodic basis, which is configurable on server computer 105a, in order to comply with the optimal arrangement of products that is defined (block 270).

As a result, electronic planogram shows an image of the optimal placement of each product available for sale within the retail store's inventory. Furthermore, the updating of electronic planogram 120a can also include updating related software systems (e.g., labor management software system and/or order management software system) based on data generated from shopper queries for product information and offers, via mobile computing device 105b, in order to make the data generated actionable (i.e., useful) for various purposes such as data analytics and reporting. Accordingly, an end user (e.g., retail store employee) of inventory tracker program 120 can utilize electronic planogram 120a to identify products that have been misplaced. Moreover, fixed assets may also be tracked and shown in electronic planogram 120a in the same manner described above.

Next, inventory tracker program 120 sends the query object to product catalog database 128, via inventory management software 115 and product information management software 125, to retrieve product information and offers that are customized for an end user based on data collected from mobile computing device 105b (block 275). The product information and offers retrieved can include information about goods and services such the availability of products and services, sale promotions, and discounts that the end user may be interested based on the profile of the end user. Subsequently, contextual query search program 140 receives the product information and offers on mobile computing device 105b, which is viewable by the end user via user interface 140a (block 280), and the program code ends.

Figure 3:
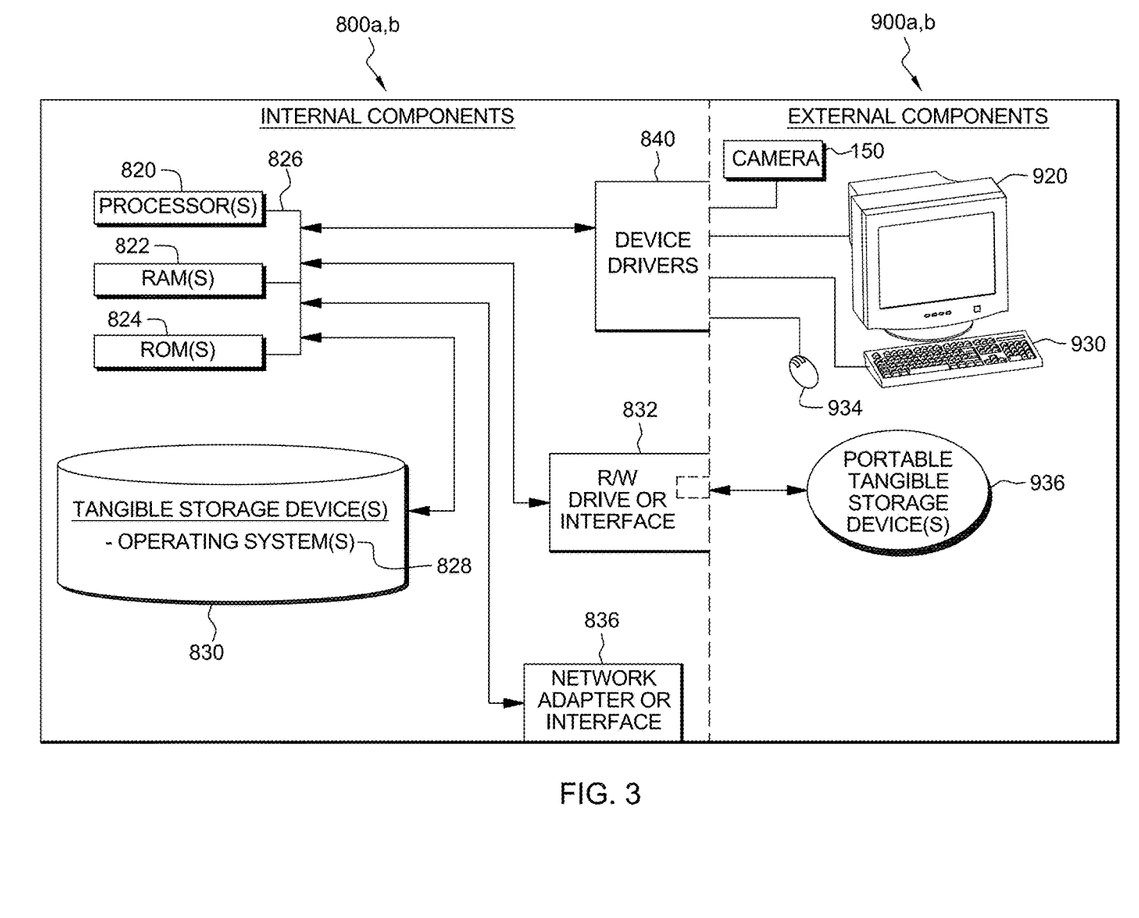
FIG. 3 is a block diagram depicting internal and external components of the mobile computing device and the server computer of FIG. 1 according to an embodiment of the present invention.

FIG. 3 is a block diagram depicting a set of internal components 800a and 800b and a set of external components 900a and 900b that correspond to respective server computer 105a and mobile computing device 105b. Internal components 800a and 800b each include one or more processors 820, one or more computer readable RAMs 822 and one or more computer readable ROMs 824 on one or more buses 826, and one or more operating systems 828 and one or more computer readable tangible storage devices 830. The one or more operating systems 828, inventory management software 115, inventory tracker program 120 with electronic planogram 120a, product information management software 125, and point of sale software 130 on server computer 105a; and contextual query search program 140 and retail store location-based service software 145 or some other location-based services technology on mobile computing device 105b are stored on one or more of the respective computer readable tangible storage devices 830 for execution by one or more of the respective processors 820 via one or more of the respective RAMs 822 (which typically include cache memory). In the embodiment illustrated in FIG. 3, each of the computer readable tangible storage devices 830 is a magnetic disk storage device of an internal hard drive. Alternatively, each of the computer readable tangible storage devices 830 is a semiconductor storage device such as ROM 824, EPROM, flash memory or any other computer readable tangible storage device that can store a computer program and digital information.

Each set of internal components 800a and 800b includes a R/W drive or interface 832 to read from and write to one or more portable computer readable tangible storage devices 936 such as CD-ROM, DVD, memory stick, magnetic tape, magnetic disk, optical disk or semiconductor storage device. Inventory management software 115, inventory tracker program 120 with electronic planogram 120a, product information management software 125, and point of sale software 130 on server computer 105a; and contextual query search program 140 and retail store location-based service software 145 or some other location-based services technology on mobile computing device 105b can be stored on one or more of the respective portable computer readable tangible storage devices 936, read via the respective R/W drive or interface 832 and loaded into the respective hard drive or computer readable tangible storage device 830.

Furthermore, each set of internal components 800a and 800b also includes a network adapter or interface 836 such as TCP/IP adapter card, wireless wi-fi interface card, or 3G or 4G wireless interface card or other wired or wireless communication link. Inventory management software 115, inventory tracker program 120 with electronic planogram 120a, product information management software 125, and point of sale software 130 on server computer 105a; and contextual query search program 140 and retail store location-based service software 145 or some other location-based services technology on mobile computing device 105b can be downloaded to respective server computer 105a and mobile computing device 105b from an external computer or external storage device via a network (for example, the Internet, a LAN, or a WAN) and respective network adapters or interfaces 836. From the network adapter or interface 836, inventory management software 115, inventory tracker program 120 with electronic planogram 120a, product information management software 125, and point of sale software 130 on server computer 105a; and contextual query search program 140 and retail store location-based service software 145 on mobile computing device 105b are loaded into at least one respective hard drive or computer readable tangible storage device 830. The network may comprise copper wires, optical fibers, wireless transmission, routers, firewalls, switches, gateway computers and/or servers.

Each set of external components 900a and 900b can include a computer display monitor 920, a keyboard 930, and a computer mouse 934. External components 900a and 900b can also include touch screens, virtual keyboards, touch pads, pointing devices, and other human interface devices. Each set of internal components 800a and 800b also includes device drivers 840 to interface to computer display monitor 920, keyboard 930 and computer mouse 934. The device drivers 840, R/W drive or interface 832 and network adapter or interface 836 comprise hardware and software in which the software is stored in computer readable tangible storage device 830 and/or ROM 824.

It should be appreciated that FIG. 3 provides only an illustration of one implementation and does not imply any limitations with regard to the environments in which different embodiments may be implemented. A variety of modifications to the depicted environments may be implemented. Moreover, a variety of modifications to the depicted environments may be made based on design and implementation requirements.

In accordance with the foregoing, a method, a computer system, and a computer program product have been disclosed for generating a contextual search query to retrieve product information and offers that are customized for an end user based on data collected from a mobile computing device. However, numerous modifications substitutions can be made without deviating from the scope of an embodiment of the invention. Therefore, one or more embodiments of the invention have been disclosed by way of example and not limitation.

What is claimed is:

1. A method for processing a search query to retrieve product information and offers that are customized for an end user, said method comprising:
   generating, by a server computer, an electronic planogram that defines an expected location of a product in a retail store and expected locations of other products in the retail store, and provides a graphical representation of the expected locations;
   receiving, by the server computer from a mobile computing device used by the end user, a communication comprising a query object, an approximate location of the product in the retail store, barcode information about the product obtained from the product in the retail store by the mobile computing device, and a database search query generated by the mobile computing device by a process comprising concatenating the barcode information about the product into a delimited string and transforming the delimited string into the database search query, wherein information within the query object comprises (i) an image of the product in the retail store captured by a camera in the mobile computing device and (ii) the database search query, wherein the approximate location of the product is based on a location of the mobile device when the image of the product was captured by the camera, wherein the approximate location is external to the query object in the communication;
   determining, by the server computer using the expected location of the product in the electronic planogram, that the approximate location of the product differs from the expected location of the product by more than a specified threshold distance and in response, said server computer generating an electronic message for subsequent broadcast to employees of the retail store, said electronic message communicating that the product is misplaced in the retail store;
   receiving, by the server computer from the mobile computing device a profile stored in a memory of the mobile computing device, said profile associated with the end user;
   determining, by the server computer by extracting and using the information in the profile associated with the end user, shopping preferences of the end user and buying patterns of the end user;
   searching, by the server computer using the database search query, the product catalog database in the server computer, wherein the product catalog database is a searchable electronic catalog;
   retrieving, by the server computer from said searching the product catalog database using the database search query, the product information and offers that are customized for the end user, wherein the retrieved product information and offers that are customized for the end user are based on the profile associated with the end user;
   sending, by the server computer to the mobile computing device, the retrieved product information and offers that are customized for the end user;
   updating inventory management metrics using the information within the query object;
   updating the electronic planogram using the information within the query object and notification of a sale transaction;
   displaying, via the electronic planogram, an image of an optimal placement of each product available for sale within the retail store's inventory; and
   using the query object and the electronic planogram to identify products that have been misplaced, maintain adequate inventory levels to meet customer demands, track the location of products within the retail store, and retrieve product information and offers from the product catalog database.

2. The method of claim 1, wherein the server computer and the mobile computing device communicate with each other across a network.

3. The method of claim 1, wherein the barcode information about the product comprises a name of the product, a description of the product, and metadata pertaining to the product.

4. The method of claim 1, wherein the retrieved product information and offers that are customized for the end user comprise an availability of both the product and services associated with the product, sale promotions of the product, and discounts that may be of interest to the end user.

5. The method of claim 1, wherein the database search query is configured to be used for searching a product catalog database in the server computer for the product information and offers that are customized for the end user.

6. The method of claim 1, said method further comprising:
   updating the electronic planogram on a scheduled periodic basis in compliance with an optimal arrangement of the retail store's products.

7. The method of claim 1, said profile comprising information that includes color preferences of the end user, design pattern preferences of the end user, size preferences of the end user, texture preferences of the end user, price range preferences of the end user, time of day, shopping preferences of the end user, birthday of the end user, and vacations of the end user.

8. The method of claim 1, wherein the metadata pertaining to the product comprises information about a current season and a current time of day during which the image of the product was captured.

9. A computer program product, said computer program product not including a transitory signal, said computer program product comprising one or more computer readable hardware storage devices having computer readable program code stored therein, said program code being executable by one or more processors to implement a method for processing a contextual search query to retrieve product information and offers that are customized for an end user, said method comprising:

generating, by a server computer, an electronic planogram that defines an expected location of a product in a retail store and expected locations of other products in the retail store, and provides a graphical representation of the expected locations;

receiving, by the server computer from a mobile computing device used by the end user, a communication comprising a query object, an approximate location of the product in the retail store, barcode information about the product obtained from the product in the retail store by the mobile computing device, and a database search query generated by the mobile computing device by a process comprising concatenating the barcode information about the product into a delimited string and transforming the delimited string into the database search query, wherein information within the query object comprises (i) an image of the product in the retail store captured by a camera in the mobile computing device and (ii) the database search query, wherein the approximate location of the product is based on a location of the mobile device when the image of the product was captured by the camera, wherein the approximate location is external to the query object in the communication;

determining, by the server computer using the expected location of the product in the electronic planogram, that the approximate location of the product differs from the expected location of the product by more than a specified threshold distance and in response, said server computer generating an electronic message for subsequent broadcast to employees of the retail store, said electronic message communicating that the product is misplaced in the retail store;

receiving, by the server computer from the mobile computing device a profile stored in a memory of the mobile computing device, said profile associated with the end user;

determining, by the server computer by extracting and using the information in the profile associated with the end user, shopping preferences of the end user and buying patterns of the end user;

searching, by the server computer using the database search query, the product catalog database in the server computer, wherein the product catalog database is a searchable electronic catalog;

retrieving, by the server computer from said searching the product catalog database using the database search query, the product information and offers that are customized for the end user, wherein the retrieved product information and offers that are customized for the end user are based on the profile associated with the end user;

sending, by the server computer to the mobile computing device, the retrieved product information and offers that are customized for the end user;

updating inventory management metrics using the information within the query object;

updating the electronic planogram using the information within the query object and notification of a sale transaction;

displaying, via the electronic planogram, an image of an optimal placement of each product available for sale within the retail store's inventory; and using the query object and the electronic planogram to identify products that have been misplaced, maintain adequate inventory levels to meet customer demands, track the location of products within the retail store, and retrieve product information and offers from the product catalog database.

10. The computer program product of claim 9, wherein the server computer and the mobile computing device communicate with each other across a network.

11. The computer program product of claim 9, wherein the barcode information about the product comprises a name of the product, a description of the product, and metadata pertaining to the product.

12. The computer program product of claim 9, wherein the retrieved product information and offers that are customized for the end user comprise an availability of both the product and services associated with the product, sale promotions of the product, and discounts that may be of interest to the end user.

13. The computer program product of claim 9, wherein the database search query is configured to be used for searching a product catalog database in the server computer for the product information and offers that are customized for the end user.

14. The computer program product of claim 9, said method further comprising:

updating the electronic planogram on a scheduled periodic basis in compliance with an optimal arrangement of the retail store's products.

15. A system, comprising:

a server computer configured to:

generate an electronic planogram that defines an expected location of a product in a retail store and expected locations of other products in the retail store, and provides a graphical representation of the expected locations;

receive from a mobile computing device used by an end user, a communication comprising a query object, an approximate location of the product in the retail store, barcode information about the product obtained from the product in the retail store by the mobile computing device, and a database search query generated by the mobile computing device by a process comprising concatenating the barcode information about the product into a delimited string and transforming the delimited string into the database search query, wherein information within the query object comprises (i) an image of the product in the retail store captured by a camera in the mobile computing device and (ii) the database search query, wherein the approximate location of the product is based on a location of the mobile device when the image of the product was captured by the camera, wherein the approximate location is external to the query object in the communication;

determine, using the expected location of the product in the electronic planogram, that the approximate location of the product differs from the expected location of the product by more than a specified threshold distance and in response, said server computer generating an electronic message for subsequent broadcast to employees of the retail store, said electronic message communicating that the product is misplaced in the retail store;

receive, from the mobile computing device, a profile stored in a memory of the mobile computing device, said profile associated with the end user;

determining, by the server computer by extracting and using the information in the profile associated with the end user, shopping preferences of the end user and buying patterns of the end user;

search, using the database search query, the product catalog database in the server computer, wherein the product catalog database is a searchable electronic catalog;

retrieve, from said searching the product catalog database using the database search query, product information and offers that are customized for the end user, wherein the retrieved product information and offers that are customized for the end user are based on the profile associated with the end user;

send, to the mobile computing device, the retrieved product information and offers that are customized for the end user;

update inventory management metrics using the information within the query object;

update the electronic planogram using the information within the query object and notification of a sale transaction;

display, via the electronic planogram, an image of an optimal placement of each product available for sale within the retail store's inventory; and use the query object and the electronic planogram to identify products that have been misplaced, maintain adequate inventory levels to meet customer demands, track the location of products within the retail store, and retrieve product information and offers from the product catalog database.

16. The system of claim 15, wherein the server computer and the mobile computing device communicate with each other across a network.

17. The system of claim 15, wherein the barcode information about the product comprises a name of the product, a description of the product, and metadata pertaining to the product.

18. The system of claim 15, wherein the retrieved product information and offers that are customized for the end user comprise an availability of both the product and services associated with the product, sale promotions of the product, and discounts that may be of interest to the end user.

19. The system of claim 15, wherein the database search query is configured to be used for searching a product catalog database in the server computer for the product information and offers that are customized for the end user.

20. The system of claim 15, said server computer configured to:

update the electronic planogram on a scheduled periodic basis in compliance with an optimal arrangement of the retail store's products.

* * * * *